C. J. KINTNER.
HOSE CONNECTOR.
APPLICATION FILED AUG. 14, 1909.
1,000,414.
Patented Aug. 15, 1911
2 SHEETS—SHEET 1.
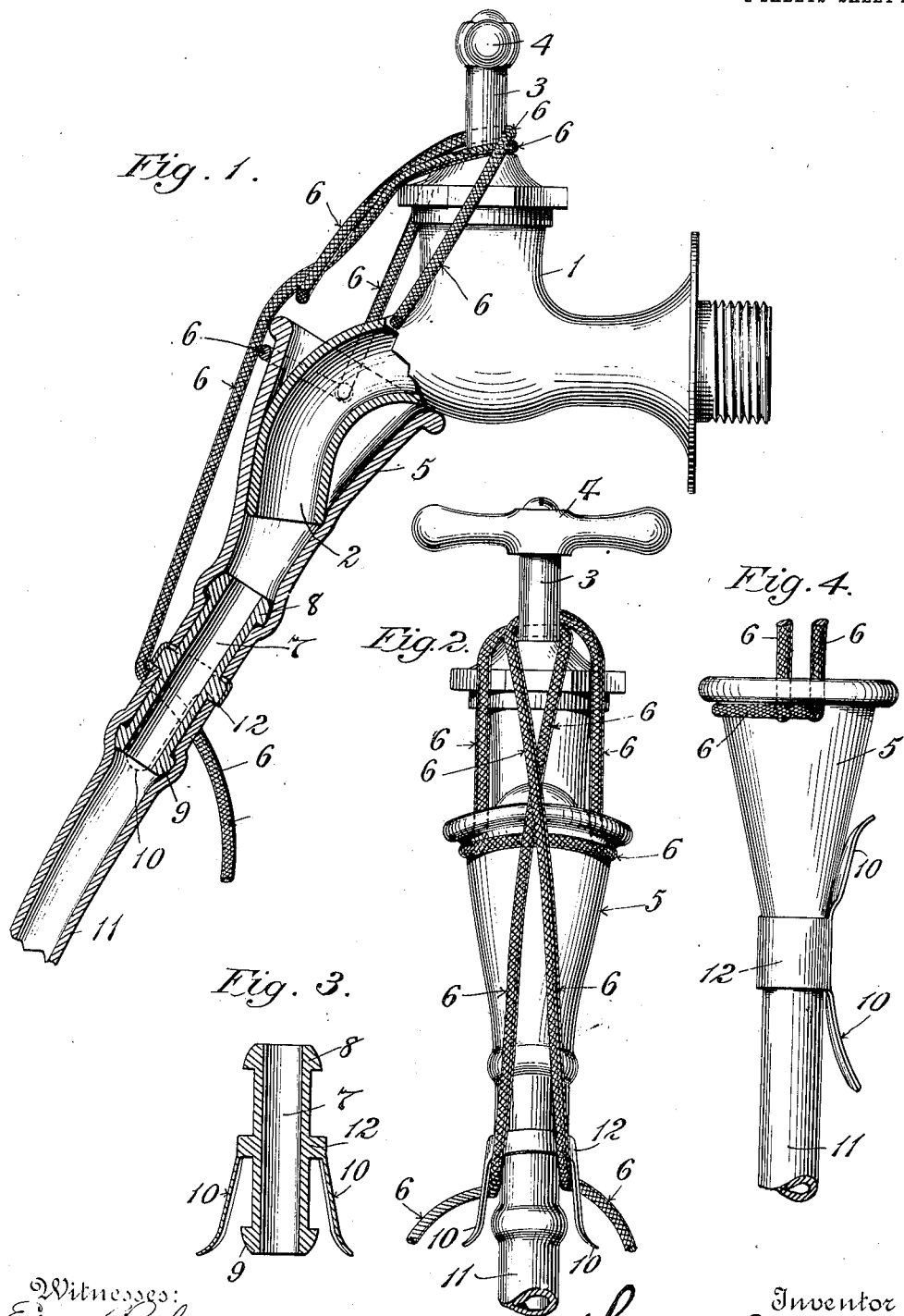

C. J. KINTNER.
HOSE CONNECTOR.
APPLICATION FILED AUG. 14, 1909.
1,000,414.
Patented Aug. 15, 1911.
2 SHEETS—SHEET 2.
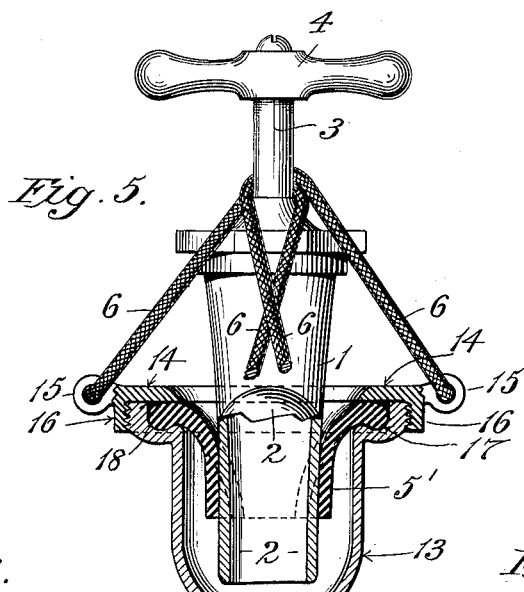
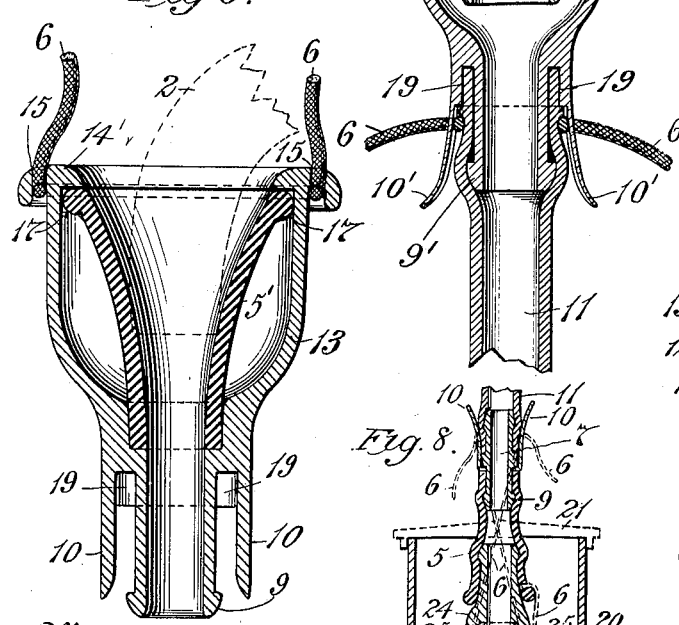
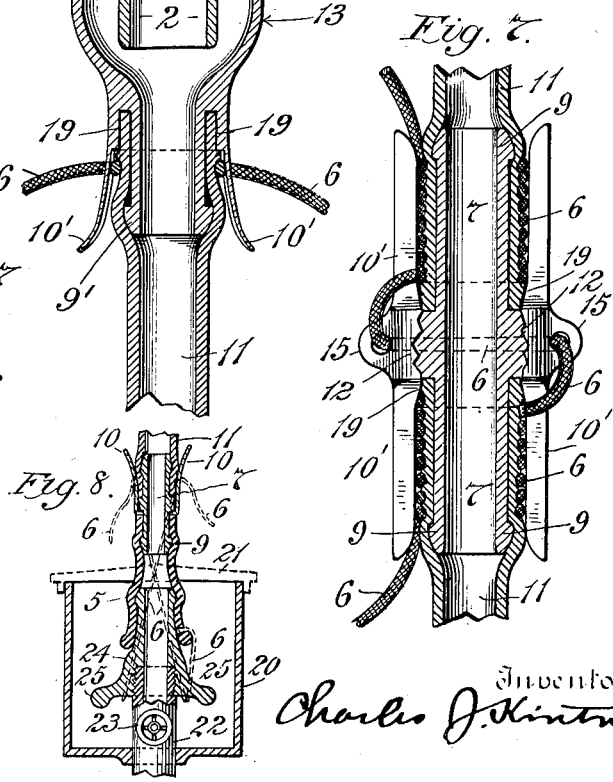
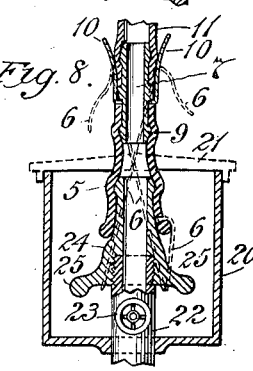

UNITED STATES PATENT OFFICE.

CHARLES J. KINTNER, OF NEW YORK, N. Y.

HOSE-CONNECTOR.

1,000,414. Specification of Letters Patent. Patented Aug. 15, 1911.
Application filed August 14, 1909. Serial No. 512,926.

*To all whom it may concern:*

Be it known that I, CHARLES J. KINTNER, a citizen of the United States, and resident of New York city, borough of Manhattan, county and State of New York, have made a new and useful Invention in Hose-Connectors, of which the following is a specification.

My invention has for its objects, first, to provide a rigid tubular connector for uniting together two or more sections of hose or for connecting a hose or tube directly to a source of water supply. Second, to provide novel means for quickly and effectually mending flexible hose or tubes when the same burst at one or more points.

My invention will be fully understood by referring to the accompanying drawings, in which, Figure 1 shows, partly in side elevational and partly in sectional view, a water-faucet with a hose or tube secured thereto through the agency of my invention, as applied in connection with my novel means for attaching flexible tubes to faucets, etc. disclosed in an earlier patent granted to me by the U. S. Patent Office on the 13th day of August, 1907 and numbered 863,571. Fig. 2 is an end elevational view as seen looking at Fig. 1 from left to right. Fig. 3 is a sectional view of the tubular connector part which is here illustrated as in one integral piece. Fig. 4 is a side elevational view of a modified form of the invention as applied in connection with my earlier invention. Fig. 5 is a sectional view of a modified form of the present invention showing the water-faucet to which it is secured partly in elevational and partly in sectional view. Fig. 6 is a sectional view of a still further modified form, somewhat similar to the form shown in Fig. 5. Fig. 7 is a sectional view of my invention as applied either to the joining of two sections of hose together, or for mending hose after the same has burst.

Referring now to the drawings in detail and first to Figs. 1 to 3 inclusive, 1 represents a water-faucet, 2 the mouth, and 3 the stem thereof, 4 being the operating handle. 5 represents my before-mentioned novel connector and 6 the cord for securing the same to the faucet in the manner shown. 7 represents my improved hose connector, the same consisting of a tubular sleeve or core of the desired length having substantially the internal diameter of the hose or tube and the connector to which it is to be attached. 8 and 9 represent the enlarged ends thereof. 10, 10 represent one or more cleats or clamping devices which are illustrated in Figs. 1 and 2 as integral with a hollow cup-shaped part adapted to be slipped over and fit accurately around the enlarged part 12 of the connector, so as to form two clamping cleats or arms, as clearly shown in dotted lines Fig. 1 and in full lines, Fig. 2. 11 represents the flexible tube or hose adapted to be attached to the flexible cone-shaped connector 5. In using this form of the invention the enlarged part 12 being integral with the cleats or clamping devices 10, 10 is first slipped over one end of the connector 7 and then the connector 5 is forced into place against the rear face of said enlarged part 12. The parts as thus assembled are then connected to the faucet 1 by drawing the flexible connector 5 over the mouth 2 thereof and lashing the cord 6 about the stem 3, finally looping the ends thereof under the cleats or clamping devices any number of times so as to thereby give an effective clamping action upon the end of the tube 11 between the cleats 10 and the connector 7. It will be seen that with this arrangement the cord or chain 6 not only securely holds the flexible cone-shaped connector 5 over the mouth 2 of the faucet, but similarly binds the end of the tube or hose 11 firmly in such manner as to prevent its being blown off, thereby avoiding the necessity of uniting the hose directly to the connector 7 by extraneous means, as is usually done with devices of this nature.

In Fig. 4 of the drawings I have shown a modified form of the invention in which the connector 5 and tube or hose 11 are made in one integral piece and the enlarged part 12 being tubular is slipped over the tube until it assumes the position shown with the cleats or clamping devices 10 located in the manner shown. After this form of the device is held in position over the mouth 2 of the faucet the ends of the cords 6 are wound around and under the two cleats 10 in the same manner that halyards are usually secured or wound around the cleats attached to the mast of a vessel.

In Fig. 5 I have shown another way of applying the present invention for the attachment of a flexible tube or hose to the mouth 2 of a faucet 1. In this instance a cup-shaped part 13 is cast in one integral piece with the enlarged end 9' of the connector 7 proper, the cleats or clamping devices being also cast integral therewith and a grooved cup 19 cast therein which answers as a seat for the end of the tube or hose 11, as clearly indicated in dotted lines. The upper end of the part 13 is provided with a grooved seat 18 for a slightly coned connector 5' of relatively very soft rubber; 14 being a detachable cap provided with ears 15 for securing the cords 6, and with a downwardly extending rim or lip 16 which is screw-threaded to fit corresponding screw-threads at the upper enlarged end of the part 13, the structural arrangement being such that when the enlarged or outer rim 17 of the connector 5' is slipped into the groove 18, the cap 14 may be screwed home so as to securely hold said connector in position as clearly shown.

In using this form of the invention the mouth 2 of the faucet is forced downward into the soft rubber connector 5' and caused to assume the position shown, after which the cords 6 are wound around the stem 3 in the manner shown and the ends thereof secured under the cleats 10', as before, the security with which such attachment may be effected being dependent upon the number of times the ends of the cords are passed between the cleats or clamps 10' and the outer surface of the end of the tube or hose 11, it being apparent that a practically rigid connection is thus effected which cannot be destroyed by abnormal pressures of water.

In Fig. 6 I have disclosed a slightly modified form of the invention as shown in Fig. 5, in which the lower end of the flexible tubular connector rests in a seat cast in the inner surface of the cup-shaped part 13, the grooved cup 19 hereinbefore referred to in connection with Fig. 5 being more clearly shown in this modified form. In this form of the invention, however, the cap 14' is cast integral with the body part 13 and an inner ledge is provided which holds the flexible connector 5' securely in position when the latter is forced into its seated position. The use of this modified form of the invention is obvious, it being apparent that when the flexible rubber connector 5' is once secured in position it will not readily become detached and will serve the same function as the like part in Fig. 5 and not subject the rubber to unnecessary strain.

In Fig. 7 I have illustrated my improvement as specifically applicable to connecting the ends of flexible hose together. This form of the invention does not differ from the form shown in Figs. 1 and 3, other than that there are four cleats or clamping devices 10', two at each end, and the cord 6 is secured in a groove about the outer face of the body part 12 and through ears 15, 15, the entire structural device being cast in one integral piece, if preferred; or, the connector 7 itself might be cast in one piece and the enlarged part 12' with the cleats or clamping devices 10' formed from a tube or in any preferred way and slipped over the body part and secured thereto, the essential feature in this form of the invention as a hose connector being that the connector 7 shall act as a base or means of support for the two ends of the tubes 11 when forced into position, and also that the plurality of arms, four or more as desired, may be utilized in the manner shown; that is to say, by forcing the two respective ends of the tube or hose 11 into position in the cups 19, after which the two or more cords 6 are drawn and wound securely around the two ends in any preferred manner, either zigzag, or as may readily suggest itself to the person using the device, it being apparent that the winding or drawing of the cords under the four cleats or clamping devices may be disposed of in various ways, it being obvious also that when once drawn and wound in the manner shown the two ends of the hose or tube will be so firmly gripped or secured between the connector 7, the cleats or clamps 10 and the enlarged ends 9 that by no possibility can the hose be separated in use, the same being capable of withstanding great strain. This form of the invention is also applicable for the mending of soft rubber hose, it being obvious that it only requires, where a hose is broken that the same be cut in two and the ruptured or broken part entirely eliminated, the two ends again being connected together in the manner described, it being obvious that if necessary the entire joint or connection when thus effected may be covered with an adhesive tape or with short tubular rubber sleeves in a manner well understood by those skilled in the art.

I do not limit my invention to the details of construction herein, as I believe it is broadly new with me to provide a rigid tubular connector with one or more clamping or binding cleats 10 so located with relation thereto that when such rigid connector is secured in place between the ends of two flexible tubular parts, a cord, chain, or other flexible means may be wound therearound in the manner described so as to effectually bind the joined ends of such tubular parts to the connector and prevent all possibility of leakage or separation of the parts under relatively great pressures. Nor do I limit myself to any particular structural arrangement of the specially devised hose or tube connector illustrated in Fig. 7, as obviously this might be made of one integral piece of cast metal, as shown; or, the core or body part thereof might be turned from wood and the cleats or arms 10', 10' stamped out of one integral flat piece of metal; then rolled together, the adjoining edges having upturned lips through which two holes or eyes (like those shown in Fig. 7) might be stamped, one constituting a means for sustaining the cord 6 and the other means for sustaining a clamping screw, so that the same might be firmly bound or clamped to the core part.

I make no claim in the present application to the specific structural forms of the device disclosed in Figs. 5 and 6 of the drawings, as these features are specifically claimed in a divisional application filed by me in the U. S. Patent Office on the 23rd day of June, 1911 and bearing Serial No. 635,028.

Having thus described my invention what I claim and desire to secure by Letters Patent of the United States is:—

1. A connector embracing a tubular sleeve or core, a plurality of binding cleats connected thereto, and additional means for frictionally binding the ends of one or more tubes by forcing the same between the core and the cleats.

2. A connector embracing a tubular sleeve or core, a plurality of binding cleats connected thereto, and one or more cords for binding the ends of one or more tubes between the core and the cleats.

3. A connector embracing a tubular sleeve or core having enlarged ends, a plurality of binding cleats connected thereto, and flexible means for binding the ends of one or more tubes between the core and the cleats.

4. A connector embracing a tubular sleeve or core with enlarged ends, a plurality of binding cleats connected thereto, and one or more cords for binding the ends of one or more tubes between the core and the cleats.

5. A connector embracing a tubular sleeve or core provided with a plurality of binding cleats, and a grooved cup adapted to receive the end of a flexible tube; in combination with flexible means for binding the end of the tube between the cleats and the tubular sleeve or core.

6. A connector embracing a tubular sleeve or core with an enlarged end and provided with a plurality of binding cleats, and a grooved cup adapted to receive the end of a flexible tube; in combination with flexible means for binding the end of the tube between the cleats and the tubular sleeve or core.

7. A connector embracing a tubular sleeve or core and a plurality of binding cleats extending over the ends thereof; in combination with a flexible cord adapted to bind the adjoining ends of two tubes between the cleats and the ends of the sleeve or core.

8. A connector embracing a tubular sleeve or core having enlarged ends and provided with a plurality of binding cleats extending over the ends thereof; in combination with a flexible cord adapted to bind the adjoining ends of two tubes between the cleats and the ends of the sleeve or core.

9. A connector embracing a tubular sleeve or core, an enlarged intermediate part, a plurality of cleats extending over the ends of the sleeve or core, and means for frictionally binding the ends of the tubes to be connected between the ends of the core and the cleats.

10. A connector embracing a tubular sleeve or core, an enlarged intermediate part, and a plurality of cleats extending over the ends of the sleeve or core; together with flexible means adapted to be inserted between the ends of the tube or hose and the cleats in such manner as to bind said ends firmly against the ends of the sleeve or core.

In testimony whereof I have signed my name to this specification in the presence of two subscribing witnesses.

CHARLES J. KINTNER.

Witnesses:
M. F. KEATING,
THOMAS F. KEATING.